(12) United States Patent
Kasvand et al.

(10) Patent No.: US 7,389,340 B2
(45) Date of Patent: Jun. 17, 2008

(54) EXECUTION SETS FOR GENERATED LOGS

(75) Inventors: Tonis Kasvand, Nepean (CA); Thomas Gray, Carp (CA)

(73) Assignee: Mitel Networks Corporation, Ottawa (CA)

( * ) Notice: Subject to any disclaimer, the term of this patent is extended or adjusted under 35 U.S.C. 154(b) by 492 days.

(21) Appl. No.: 09/832,373

(22) Filed: Apr. 11, 2001

(65) Prior Publication Data

US 2002/0040392 A1    Apr. 4, 2002

(30) Foreign Application Priority Data

Apr. 11, 2000    (GB) .................................. 0008734.6

(51) Int. Cl.
*G06F 15/173* (2006.01)
*H04M 3/08* (2006.01)
*G06F 12/14* (2006.01)
*G06F 3/00* (2006.01)

(52) U.S. Cl. ...................... 709/224; 709/243; 709/244; 379/9.03; 379/9.04; 726/22; 726/23; 719/318; 719/320

(58) Field of Classification Search ........ 709/220–226; 379/9.03, 9.04; 714/4; 717/127, 176; 726/22, 726/23; 370/216, 217; 719/311, 318, 320
See application file for complete search history.

(56) References Cited

U.S. PATENT DOCUMENTS

| | | | |
|---|---|---|---|
| 5,063,523 A | 11/1991 | Vrenjak | |
| 5,121,475 A | 6/1992 | Child et al. | |
| 5,440,688 A | 8/1995 | Nishida | |
| 5,463,768 A * | 10/1995 | Cuddihy et al. | ............... 714/37 |
| 5,634,008 A | 5/1997 | Gaffaney et al. | |
| 5,872,931 A * | 2/1999 | Chivaluri | ..................... 709/223 |
| 5,930,476 A * | 7/1999 | Yamunachari et al. | ...... 709/224 |
| 5,944,782 A * | 8/1999 | Noble et al. | ................. 709/202 |
| 6,026,500 A | 2/2000 | Topff et al. | |
| 6,233,449 B1 * | 5/2001 | Glitho et al. | ................ 455/423 |
| 6,493,755 B1 * | 12/2002 | Hansen et al. | .............. 709/224 |
| 6,505,245 B1 * | 1/2003 | North et al. | ................. 709/223 |
| 6,658,465 B1 * | 12/2003 | Touboul | ..................... 709/223 |
| 2003/0084150 A1 * | 5/2003 | Hansen et al. | .............. 709/224 |

FOREIGN PATENT DOCUMENTS

| | | |
|---|---|---|
| EP | 650302 A2 | 4/1995 |
| WO | WO 9527249 | 10/1995 |

OTHER PUBLICATIONS

Search Report of Great Britain Application No. GB 0008734.6.

* cited by examiner

*Primary Examiner*—Ashok Patel

(57) ABSTRACT

A network administration system for triggering commands in response to receipt of error logs, comprising a user interface for programming execution sets of commands in association with predetermined error logs, and means for receiving error logs and for each of the predetermined ones of the error logs triggering execution of the commands in the execution sets.

6 Claims, 5 Drawing Sheets

| HLL ID | Rule Set | Brief Explanation |
|---|---|---|
| HLL001 | (LogP6000 or LogP6001 or LogP6002) from 2 or more phones. | Two or more phones are not receiving full services |
| HLL002 | LogPBX2000 + LogC3000 | Loss of services. Something is wrong with PBX2 |
| HLL003 | HLL001 + HLL002 | Loss of services. Something is wrong with T1 trunk. |

Figure 2

| HLL ID | Rule Set | Brief Explanation |
|---|---|---|
| HLL001 | (LogP6000 or LogP6001 or LogP6002) from 2 or more phones. | Two or more phones are not receiving full services |
| HLL002 | LogPBX2000 + LogC3000 | Loss of services. Something is wrong with PBX2 |
| HLL003 | HLL001 + HLL002 | Loss of services. Something is wrong with T1 trunk. |

Figure 3

| Log ID | Time Generated | Brief Description | Execution Set |
|---|---|---|---|
| LogP6000 | Feb. 29, 2000 14:23:04:12 | No dial tone for phone P2. | NONE |
| LogPBX2000 | Feb. 29, 2000 14:23:04:17 | PBX 1 is not receiving full services | -Page technician<br>-Send Medium level alarm to monitoring application |
| LogP6001 | Feb. 29, 2000 14:23:04:27 | Reduction of features available for phone P4. | -If phone has LED display, display "not fully functional" on LED display |
| LogC3000 | Feb. 29, 2000 14:23:04:29 | Client C1 cannot give services to phones. | -Do self-diagnostic of network services. |
| HLL002 | Feb. 29, 2000 14:23:04:32 | Loss of services on network. | -Page two technicians<br>-Send High level alarm to monitoring application<br>-Re-route traffic to backup PBX |
| LogP6002 | Feb. 29, 2000 14:23:05:00 | No services available for phone P1. | NONE |
| HLL001 | Feb. 29, 2000 14:23:05:03 | PBX 1 is not providing full services to phones. | -Page technician<br>-Send Medium level alarm to monitoring application |
| HLL003 | Feb. 29, 2000 14:23:05:05 | Trunk T1 is unavailable. | -Page ten technicians<br>-Send Critical level alarm to monitoring application<br>-Use another trunk if available |

EXECUTION SETS FOR GENERATED LOGS

FIELD OF THE INVENTION

This invention relates in general to network diagnostics, and more particularly to a network administration system for automatically executing instruction sets in response to generation of error logs in a network.

BACKGROUND OF THE INVENTION

It is well known in traditional computer and digital communication networks for technicians to respond to the generation of error logs by notifying affected users of system problems, analyzing and then fixing the problems using an assortment of software commands and/or tools. The use of such software commands is often repetitive and requires the technician to manually enter the commands upon each observation of a specific log.

SUMMARY OF THE INVENTION

According to the present invention, a network administration system is provided for automatically executing instructions programmed by the technician in response to receipt of particular logs. Thus, the technician is relieved of the requirement to manually and repetitively entering commands to correct repeated errors. Accordingly, the network administration system of the present invention may be advantageously used to implement automated self-repairing networks.

BRIEF DESCRIPTION OF THE DRAWINGS

A detailed description of the preferred embodiment is set forth herein below with reference to the following drawings, in which:

FIG. 2 is a table of a set of rules that have been defined for use in the network of FIG. 1;

FIG. 3 is a table showing an exemplary list of logs generated by the network of FIG. 1;

DETAILED DESCRIPTION OF THE PREFERRED EMBODIMENT

Traditionally, system error logs have been analyzed through human intervention in order to determine the sources of and to correct system errors. Thousands of logs can be generated by a single problem. For example, if a T1 line goes down, error logs could be generated by thousands of phones that cannot find a dial tone. It is known in the prior art to automatically filter error logs through "rule sets" to determine if a combination of logs satisfies a given criteria. One example of such an automated process is a product from Plexis (http://www.triadhc.com/edi.shtml) called Plexis EDI Toolkit. If the criteria is satisfied, it is known in the art either to generate a further log or to provide an overall summary for describing the problem to the technician. Thus, it is known to generate Higher Level Logs (HLL) from Lower Level Logs (LLL) in response to predetermined rule sets being satisfied The Lower Level Logs (LLL) are generated by network applications or devices. Such systems are valuable because the HLLs help to explain to the system administrator/designer what is really going on in the system.

There are instances where HLL's generate more HLL logs, or combinations of LLL's and HLL's generate new HLL's. Since HLL's are generated by LLL's and possibly other HLL's, the technician needs to see how the HLL's are triggered since rule-sets can be complex and not easily understood.

According to the present invention, each of these types of logs can be associated with a set of execution instructions. Preferably, the execution sets are implemented as software applications (e.g. shell scripts, command function utilities, etc.) that read each command line and execute its instructions. Thus, specific execution sets may be implemented on many levels of network/system analysis and repair.

Figure 1:
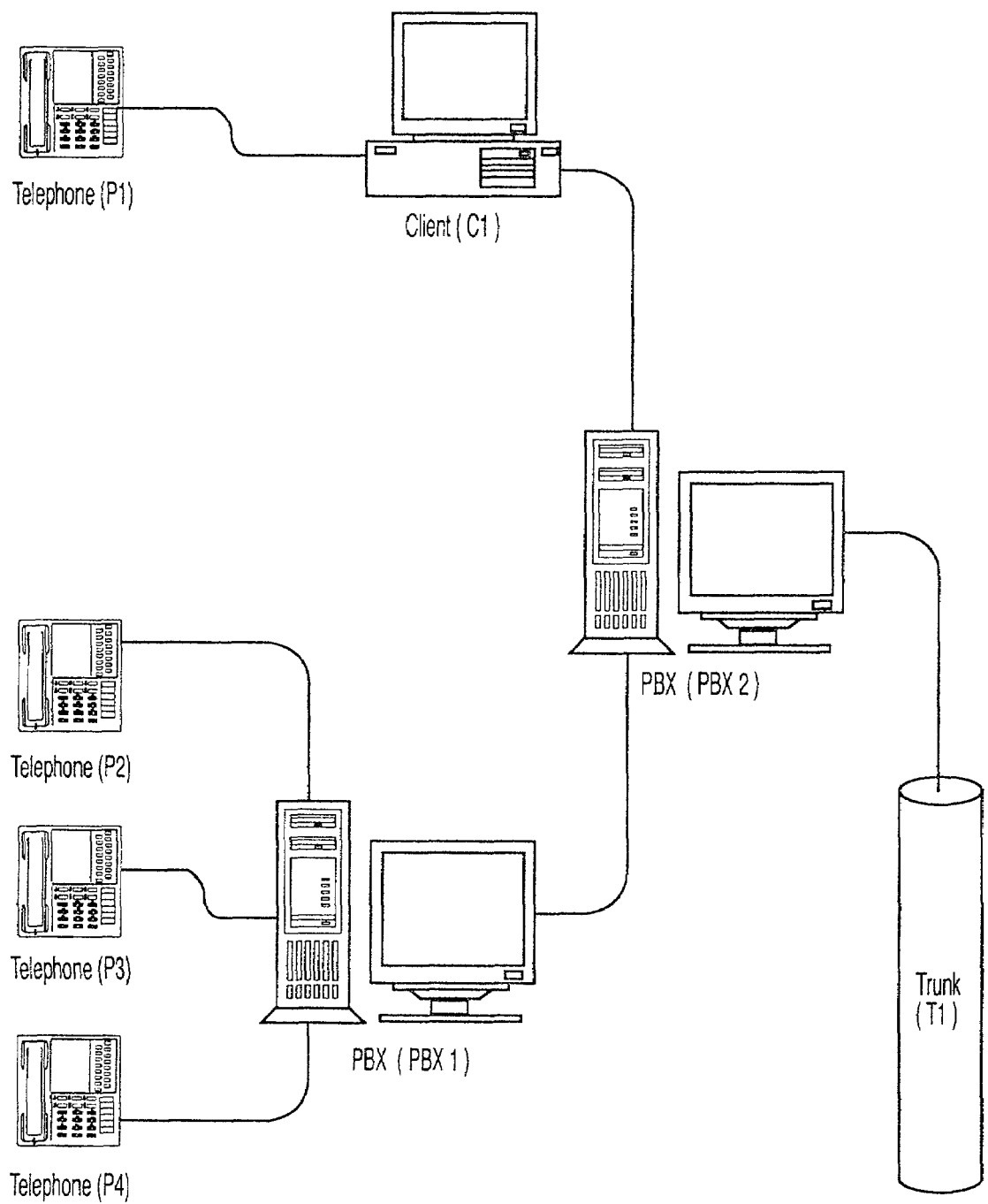
FIG. 1 is a block diagram of an exemplary network incorporating the system of the present invention.

FIG. 1 shows a typical network comprising a plurality of phones (P2 to P4) connected to a server implemented PBX (PBX 1), a further phone P1 connected to a client server C1, both the client C1 and PBX 1 being connected to a PBX 2. The PBX 2 is connected to a T1 trunk in a well known manner. Each of the devices shown in FIG. 1, with the exception of the trunk, has the capability of generating logs to inform a technician of the device status. The network configuration is for illustration purposes only, and may incorporate a host of other devices and networks.

As indicated above, FIG. 2 demonstrates a set of rule sets that are defined for use in the network of FIG. 1, and FIG. 3 shows a typical list of logs (HLL's and LLL's) that are generated from the network of FIG. 1 as well as associated execution sets when these logs are produced. The execution set does not form part of the error log, which is restricted to the Log ID, Time Generated and Brief Description. The system parses the Brief Description in order to identify the source of a particular error log.

According to the invention, a network administration system is provided for entering execution sets which are designed to execute specific commands in response to receiving a log in connection with which such an execution set has been programmed. In FIG. 1, the inventive system is incorporated into PBX 2. Alternatively, the network administration system may be implemented in a separate server connected to the network.

Figure 4:
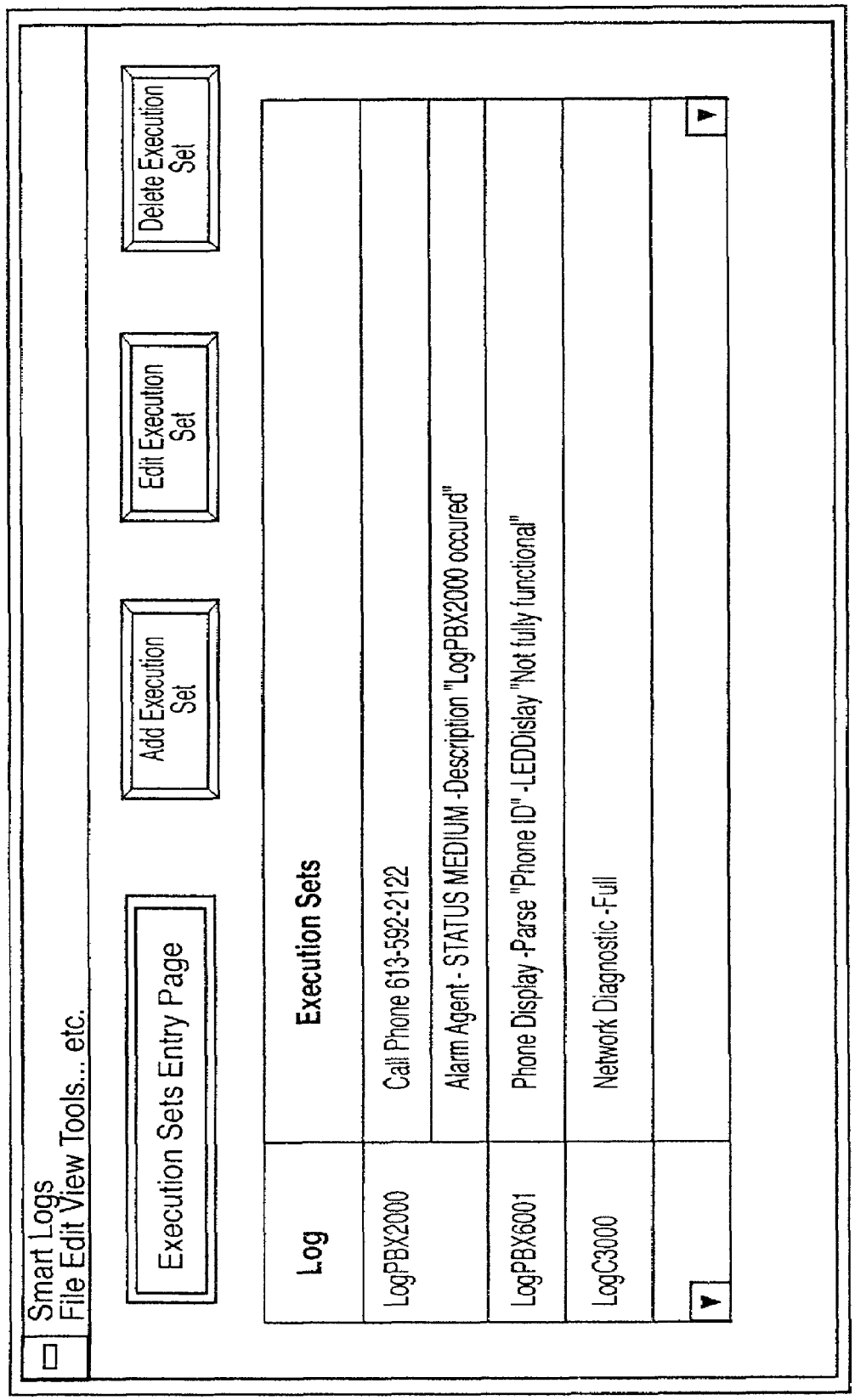
FIG. 4 shows a graphical user interface for associating execution sets with logs.

As shown in FIG. 4, a user interface is provided for associating logs with execution sets. Each command is entered into a text box relative to the associated log. The execution sets may be associated with each type of log in the software package that coordinates the logs and the execution sets. When a rule set has been satisfied, the log associated with that rule set is compared to a logs list in the execution set software application and the corresponding command line in the execution set is executed.

For the illustrated example, error logs P6000, P6001 and P6002 are generated by devices in the network, resulting in creation of HLL001. According to the invention, an execution set has been programmed for P6001 to display "not fully functional" if the phone has an LED display, and an execution set has been programmed to page the technician and send a medium level alarm upon receipt of the HLL001 log.

Figure 5:
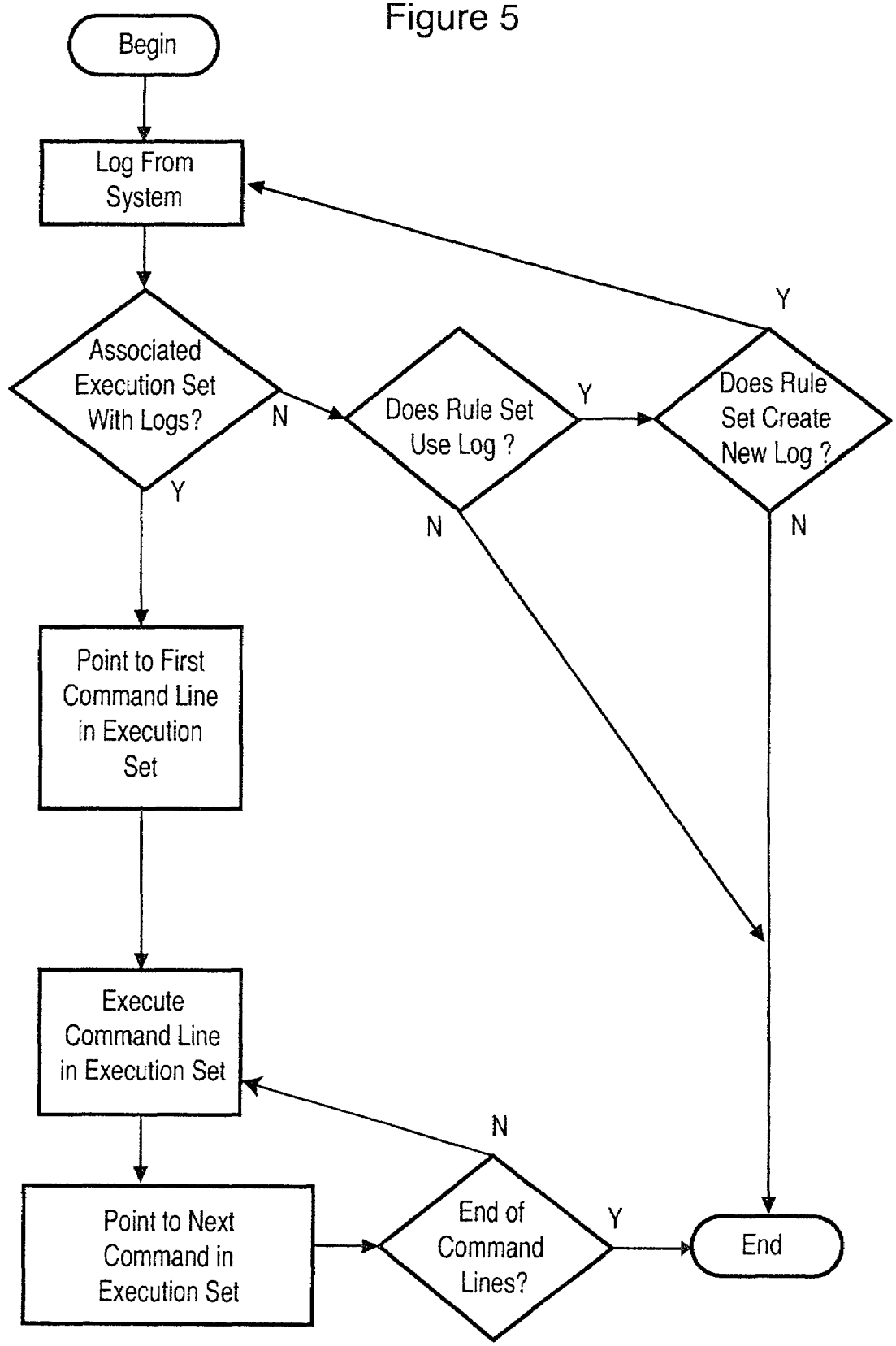
FIG. 5 is a flowchart showing process flow of the network administration system according to the preferred embodiment.

The execution sets are triggered by using software tools (e.g. Visual Basic, C++) to read the logs and determine if the logs generated have an associated execution set, as shown in FIG. 5. If there is an association, each command/service in the execution sets is triggered in order (as specified by the user) or simultaneously. Ordered triggering is set by the order of the command lines in an execution set. Thus, the first command in FIG. 4 for LogPBX2000 is the CallPhone command line, the second command is the AlarmAgent command line. The user can change the order by clicking on a command line in an execution set and dragging it up or down.

Exemplary pseudo-code of the process for implementing the network administration system of the present invention is as follows:

```
execution sets function prog
    retrieve log
    compare log with list of logs with execution sets
    if log exists with an execution set
        go to first command line in execution set
        while command lines exist in execution set
            execute command line in execution set
            if more command lines exist
                go to next command line
            endif
        endwhile
    endif
end execution sets function prog
```

Alternatives and modifications of the invention are possible within the sphere and scope as set forth in the claims appended hereto.

What is claimed is:

1. A network administration system for triggering commands in response to receipt of status logs generated by network devices and applications, comprising:
   means for receiving said status logs and generating higher level logs in response to receipt of at least two different status logs which satisfy predetermined rule sets, wherein said higher level log provides a network level brief explanation of status indicated by said at least two different status logs satisfying said predetermined rule sets;
   a user interface for programming execution sets of commands in association with predetermined ones of said higher level logs; and
   program means for receiving said higher logs, parsing each of said predetermined ones of said higher level logs to determine their respective sources, and trigging execution of said commands in said execution sets in respect of each of said respective sources;
   wherein said user interface and program means are implemented within one of said network devices.

2. The network administration system of claim 1, wherein said user interface provides ordered execution of multiple commands associated with said higher level logs in accordance with user preference.

3. The network administration system of claim 1, wherein said means for receiving said status logs and generating higher level logs includes means for generating further higher level logs in response to receipt of at least one of:
   a) at least two different higher level logs; and
   b) at least one higher level log and at least one status log.

4. A method of triggering commands in response to receipt of status logs generated by network devices and applications comprising the steps of:
   providing rule sets that are satisfied by receipt of particular combinations of at least two different status logs and when satisfied, result in the generation of higher level logs, wherein said higher level log provides a network level brief explanation of status indicated by said at least two different status logs satisfying said rule sets;
   programming execution sets of said commands in association with predetermined ones of said higher level logs;
   receiving said status logs and said higher level logs; and
   parsing each of said predetermined ones of said higher level logs to determine their respective sources and triggering execution of said commands in said execution sets in respect of each of said respective sources.

5. The method of claim 4, wherein said step of receiving said status logs and said higher level logs, parsing each of said predetermined ones of said higher level logs to determine their respective sources and triggering execution of said commands in said execution sets further comprise the steps of:
   a) detecting an execution set associated with a received higher level log; and
   b) executing each successive commands in said execution set.

6. The method of claim 4, wherein providing rule sets includes providing rule sets that are satisfied by receipt of particular combinations of at least one of:
   a) at least two different higher level logs; and
   b) at least one higher level log and at least one status log.

* * * * *